(12) United States Patent
Ryu et al.

(10) Patent No.: US 7,865,296 B2
(45) Date of Patent: Jan. 4, 2011

(54) IDENTIFICATION OF VEHICLE CG HEIGHT AND MASS FOR ROLL CONTROL

(75) Inventors: Jihan Ryu, Rochester Hills, MI (US); Nikolai K. Moshchuk, Grosse Pointe, MI (US); Shih-Ken Chen, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 169 days.

(21) Appl. No.: 12/051,391

(22) Filed: Mar. 19, 2008

(65) Prior Publication Data

US 2009/0235724 A1 Sep. 24, 2009

(51) Int. Cl.
*G06F 17/10* (2006.01)
*G01M 1/00* (2006.01)
*G05D 1/00* (2006.01)

(52) U.S. Cl. .................. 701/124; 701/1; 73/65.01; 73/65.07

(58) Field of Classification Search .......... 701/124; 73/65.01, 65.07
See application file for complete search history.

(56) References Cited

U.S. PATENT DOCUMENTS

| | | | |
|---|---|---|---|
| 6,424,907 B1 * | 7/2002 | Rieth et al. | 701/124 |
| 7,489,995 B2 * | 2/2009 | Yasui et al. | 701/37 |
| 7,571,030 B2 * | 8/2009 | Ryu et al. | 701/1 |
| 2004/0215380 A1 * | 10/2004 | Song | 701/37 |
| 2006/0276944 A1 * | 12/2006 | Yasui et al. | 701/37 |
| 2007/0017727 A1 * | 1/2007 | Messih et al. | 701/36 |
| 2007/0067080 A1 * | 3/2007 | Messih et al. | 701/37 |
| 2007/0129867 A1 * | 6/2007 | Huang et al. | 701/38 |

| | | |
|---|---|---|
| 2007/0239320 A1 | 10/2007 | Ryu et al. |

FOREIGN PATENT DOCUMENTS

| | | |
|---|---|---|
| DE | 19918525 A1 * | 10/1999 |
| JP | 11304663 A * | 11/1999 |
| WO | WO 2007098891 A1 * | 9/2007 |

OTHER PUBLICATIONS

Stevens et al. "Optimization of Vehicle Dynamics Through Statistically-Designed Experiments on Analytical Vehicle Models" 1997 North American ADAMS User Conference. Available online Mar. 19, 2006. <http://web.archive.org/web/20060319063429/http://www.mscsoftware.com/support/library/conf/adams/na/1997/uc970016.pdf>.*

* cited by examiner

*Primary Examiner*—Lisa M Caputo
*Assistant Examiner*—Jonathan Dunlap
(74) *Attorney, Agent, or Firm*—John A. Miller; Miller IP Group, PLC

(57) ABSTRACT

A system and method for determining vehicle CG height and mass in real-time. The method includes selecting a set of vehicle parameters to be considered that includes the vehicle mass and the center of gravity height of the vehicle. Frequency responses are generated using the dynamic model and a plurality of different values for the selected vehicle parameters. During vehicle operation, frequency responses are calculated from a measured vehicle lateral acceleration to a roll angle and/or a roll rate of the vehicle. The generated frequency responses and the calculated frequency responses are compared to determine which of the generated frequency responses more closely matches the calculated frequency responses. The generated frequency responses that most closely match the calculated frequency responses are used to determine the center of gravity height and the vehicle mass from the values for the vehicle parameters.

20 Claims, 2 Drawing Sheets

IDENTIFICATION OF VEHICLE CG HEIGHT AND MASS FOR ROLL CONTROL

BACKGROUND OF THE INVENTION

1. Field of the Invention

This invention relates generally to a system and method for determining the center of gravity height and mass of a vehicle for roll control and, more particularly, to a system and method for determining the center of gravity height and mass of a vehicle for roll control that includes providing frequency analysis of measured or estimated vehicle states using a vehicle dynamic model.

2. Discussion of the Related Art

Vehicle roll over control has become an important issue with the increased popularity of high center of gravity (CG) vehicles, such as sport utility vehicles (SUVs). In vehicle roll over and roll motion, the vehicle CG height and mass are critical parameters. Vehicle roll over warning and mitigation systems would thus benefit from accurate knowledge of vehicle CG height and mass.

It is known in the art to prevent potential vehicle rollover using, for example, differential braking control, rear-wheel steering control, front-wheel steering control, or any combination thereof. A vehicle roll estimation system may receive vehicle dynamics information from various sensors, such as yaw rate sensors, lateral acceleration sensors and roll rate sensors, to determine the proper amount of action to be taken to detect a potential vehicle rollover condition. A balance typically needs to be provided between estimating the vehicle roll motion and the vehicle yaw motion to provide the optimal vehicle response. Thus, it is usually necessary to detect certain vehicle conditions to provide the roll detection.

Vehicle roll stability information can be provided to vehicle drivers or impending vehicle rollover can be mitigated by activating adequate chassis control systems with knowledge of vehicle roll stability conditions. Vehicle rollover warning or avoidance systems, therefore, will show satisfactory performance if the roll stability conditions are actively known to the systems. To precisely identify vehicle roll stability conditions, it is advantageous to know the vehicle's roll rate and roll angle since they are the most important states in vehicle roll dynamics.

Nominal values of vehicle CG height and mass can be measured and employed in rollover mitigation systems. However, actual values of vehicle CG height and mass vary as a result of vehicle loading conditions, such as passengers. Truck-based vehicles, SUVs and pick-up trucks, usually have large load capacities and consequently have large variations in CG height and mass.

U.S. Patent Application Ser. No. 11/563,251, filed Nov. 27, 2006, titled In-vehicle Identification of the Relative CG Height, assigned to the assignee of this application, and herein incorporated by reference, discloses one method for identifying vehicle CG height. However, this technique does not identify vehicle mass even though both vehicle CG height and mass are important in vehicle roll motion. In addition, because this technique employs multiple Kalman filters simultaneously, it requires high computational power, which may not always be available for real-time application in production vehicles.

SUMMARY OF THE INVENTION

In accordance with the teachings of the present invention, a system and method are disclosed for determining vehicle CG height and mass in real-time using less computational power. The system and method employ frequency analysis of measured vehicle states, such as lateral acceleration, roll rate and roll angle, using a vehicle dynamic model. The method includes selecting a set of vehicle parameters to be considered that includes the vehicle mass and the center of gravity height of the vehicle. Frequency responses are generated using the dynamic model and a plurality of different values for the selected vehicle parameters, and the frequency responses are stored. During vehicle operation, frequency responses are calculated from a measured vehicle lateral acceleration to a roll angle and/or a roll rate of the vehicle. The generated frequency responses that are stored and the calculated frequency responses are compared to determine which of the generated frequency responses more closely matches the calculated frequency responses. The generated frequency responses that most closely match the calculated frequency responses are used to determine the center of gravity height and the vehicle mass from the values for the vehicle parameters.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for determining vehicle CG height and mass in real-time using frequency response analysis is merely exemplary in nature, and is in no way intended to limit the invention or its applications or uses.

Figure 1:
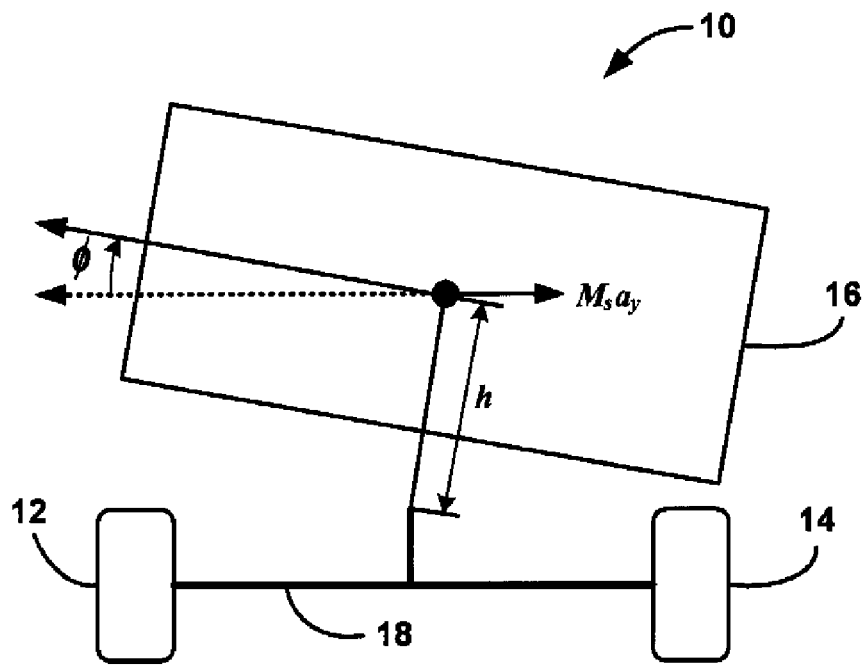
FIG. 1 is an illustration of a vehicle experiencing a roll motion.

FIG. 1 is a simplified rear-view of a vehicle 10 including a vehicle body 16 under a roll motion. A left rear wheel 12 and a right rear wheel 14 are coupled to an axel 18 of the vehicle 10. In this diagram, $\phi$ is the roll angle, $M_s$ is the vehicle sprung mass, $a_y$ is the lateral acceleration of the vehicle 10 and h is the CG height from the roll center of the vehicle 10.

Figure 2:
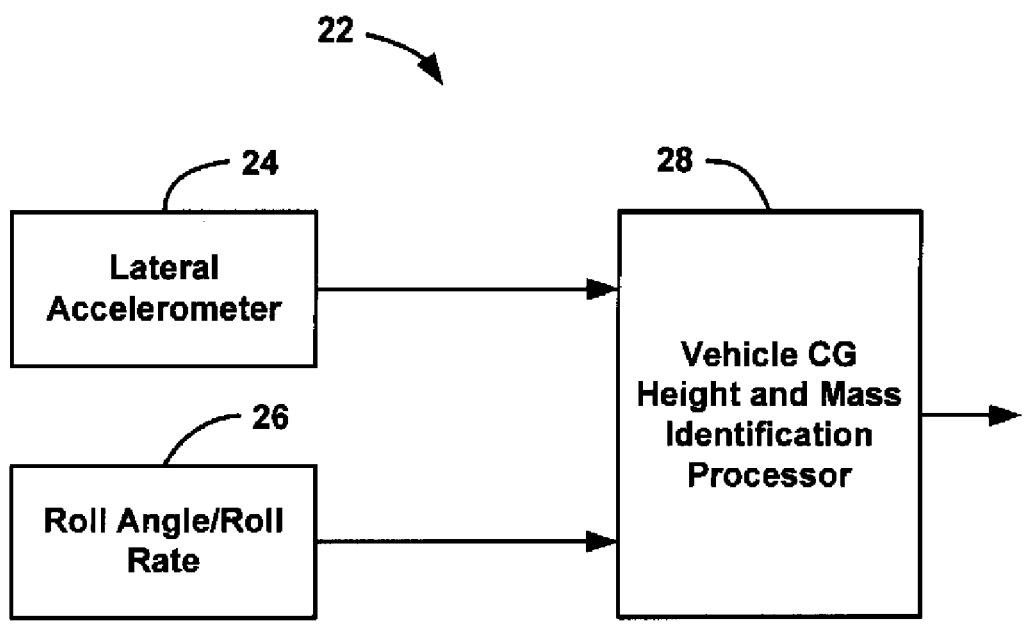
FIG. 2 is a block diagram of a system for determining vehicle CG height and mass, according to an embodiment of the present invention.

FIG. 2 is a block diagram of a system 22 for determining vehicle CG height and mass according to an embodiment of the present invention. The system 22 includes a lateral accelerometer 24, or other suitable device, that measures the lateral acceleration $a_y$ of the vehicle 10, and a suitable device 26 that measures or estimates the roll angle $\phi$ and/or roll rate $\dot{\phi}$ of the vehicle 10, such as a GPS receiver, suspension sensor or other suitable device. U.S. patent application Ser. No. 11/400,844, filed Apr. 10, 2006, titled Estimation of Vehicle Roll Rate and Roll Angle Using Suspension Deflection Sensors, assigned to the assignee of this application and herein incorporated by reference, discloses one method for estimating roll angle $\phi$ from suspension sensor measurements.

The '844 application discloses a one-degree of freedom (1-DOF) dynamic model of a vehicle roll motion shown in equation (1) below.

$$(I_{xx}+M_s h^2)\ddot{\phi}+b_r\dot{\phi}+k_r\phi=M_s h a_y \tag{1}$$

Where $I_{xx}$ is the roll moment of inertia of the vehicle body 16 (sprung mass) with respect to the vehicle CG, $M_s$ is the vehicle sprung mass, h is the CG height of the vehicle 10 from the roll center, $b_r$ is the roll damping coefficient, $k_r$ is the roll stiffness, and $a_y$ is the measured lateral acceleration, which includes the gravity component (g sin φ) due to vehicle roll as well as the true lateral acceleration of the vehicle 10.

The measured lateral acceleration $a_y$ and the roll rate φ̇ and/or roll angle φ are sent to a vehicle CG height and mass identification processor 28 that determines the vehicle CG height and mass using frequency analysis, as will be discussed in detail below.

Based on equation (1), the transfer function from the measured lateral acceleration $a_y$ to the roll angle φ can be derived as:

$$F_{Ay,Ra}(s) = \frac{M_s h}{(I_{xx} + M_s h^2 + b_r s) + k_r} \quad (2)$$

Similarly, the transfer function from the measured lateral acceleration $a_y$ to the roll rate φ̇ can be derived as:

$$F_{Ay,RR}(s) = \frac{M_s h s}{(I_{xx} + M_s h^2)s^2 + b_r s + k_r} \quad (3)$$

In the transfer functions of equations (2) and (3), the mass $M_s$, the roll moment of inertia $I_{xx}$ and the CG height h are all sensitive to loading condition and vary significantly. In order to incorporate these variations, three different sets of mass $M_s$, roll moment of inertia $I_{xx}$ and CG height h are calculated based on nominal values as $\{M_{s,h}, I_{xx,h}, h_h\}$, $\{M_{s,n}, I_{xx,n}, h_n\}$ and $\{M_{s,l}, I_{xx,l}, h_l\}$ where $M_{s,n}$, $I_{xx,n}$, and $h_n$ represent nominal values for the mass $M_s$, the roll moment of inertia $I_{xx}$ and the CG height h, respectively, and where sub-h represents high values and sub-l represents low values. To represent loading conditions with higher roll over possibilities, the values $M_{s,h}$, $I_{xx,h}$, and $h_h$ are chosen with a heavier mass $M_s$, a larger roll moment of inertia $I_{xx}$ and a higher CG height h than the nominal values. These are vehicle dependent values and a 25% increase from the nominal value can be used for a typical SUV. To represent loading conditions with lower rollover possibilities, the values $M_{s,l}$, $I_{xx,l}$, and $h_l$ are chosen with a lighter mass $M_s$, a smaller roll moment of inertia $I_{xx}$ and a lower CG height h than the nominal values. These are also vehicle dependent values, and a 10% decreased value from the nominal values can be used for a typical SUV. If necessary, more than three sets of parameters can be employed.

Using the three sets of vehicle parameters, three different frequency responses are generated for both equations (2) and (3) in the range of interest, which is vehicle dependent. For a typical SUV, the frequency range of interest is generally between 0.1 Hz and 2 Hz. The frequency response F(s) generated from equation (2) represents the frequency response of the roll angle φ output from the measured lateral acceleration $a_y$ input. The frequency response F(s) generated from equation (3) represents the frequency response of the roll rate φ̇ output from the measured lateral acceleration $a_y$ input. Techniques for generating frequency responses in this manner are well known to those skilled in the art. The generation of the frequency responses for the vehicle parameters can be done offline and can be stored in memory for later use.

If a roll angle measurement or estimation is available, a frequency response from the measured lateral acceleration $a_y$ input to the roll angle φ output is calculated during vehicle operation. Processes and calculations for determining frequency responses in this manner would be well understood to those skilled in the art. The calculated frequency response is compared to the three frequency responses generated using equation (2) for the three sets of vehicle parameters. From the three frequency responses, the one with the smallest difference in the sense of L-2 norm or root mean square (RMS) is identified as the best estimated frequency response. In other words, at predetermined times during vehicle operation, the measured lateral acceleration $a_y$ and the measured or estimated roll angle φ of the vehicle 10 are used to calculate the frequency response and that response is compared to the stored values for the three sets of vehicle parameters determined based on roll angle φ to determine which of the stored values offers the closest match or best fit. The vehicle mass $M_s$, roll moment of inertia $I_{xx}$ and CG height h for the closest frequency response are selected as the best estimated vehicle parameters.

Similarly, during vehicle operation, a frequency response from the measured lateral acceleration $a_y$ input to the roll rate φ̇ output is calculated if the roll rate measurement or estimation is available on the vehicle. The calculated frequency response is compared with the three frequency responses generated by equation (3) and stored for the three vehicle parameter sets. From the three frequency responses, the one with the smallest difference in the sense of the L-2 norm or RMS is identified as the best estimated frequency response. The vehicle mass $M_s$, the roll moment of inertia $I_{xx}$ and the CG height h for the best estimated frequency response are selected as the vehicle parameters. If both of the roll angle φ and roll rate φ̇ measurement or estimation are available, both frequency responses from the measured or estimated roll angle φ and roll rate φ̇ can be calculated and compared.

Figure 3:
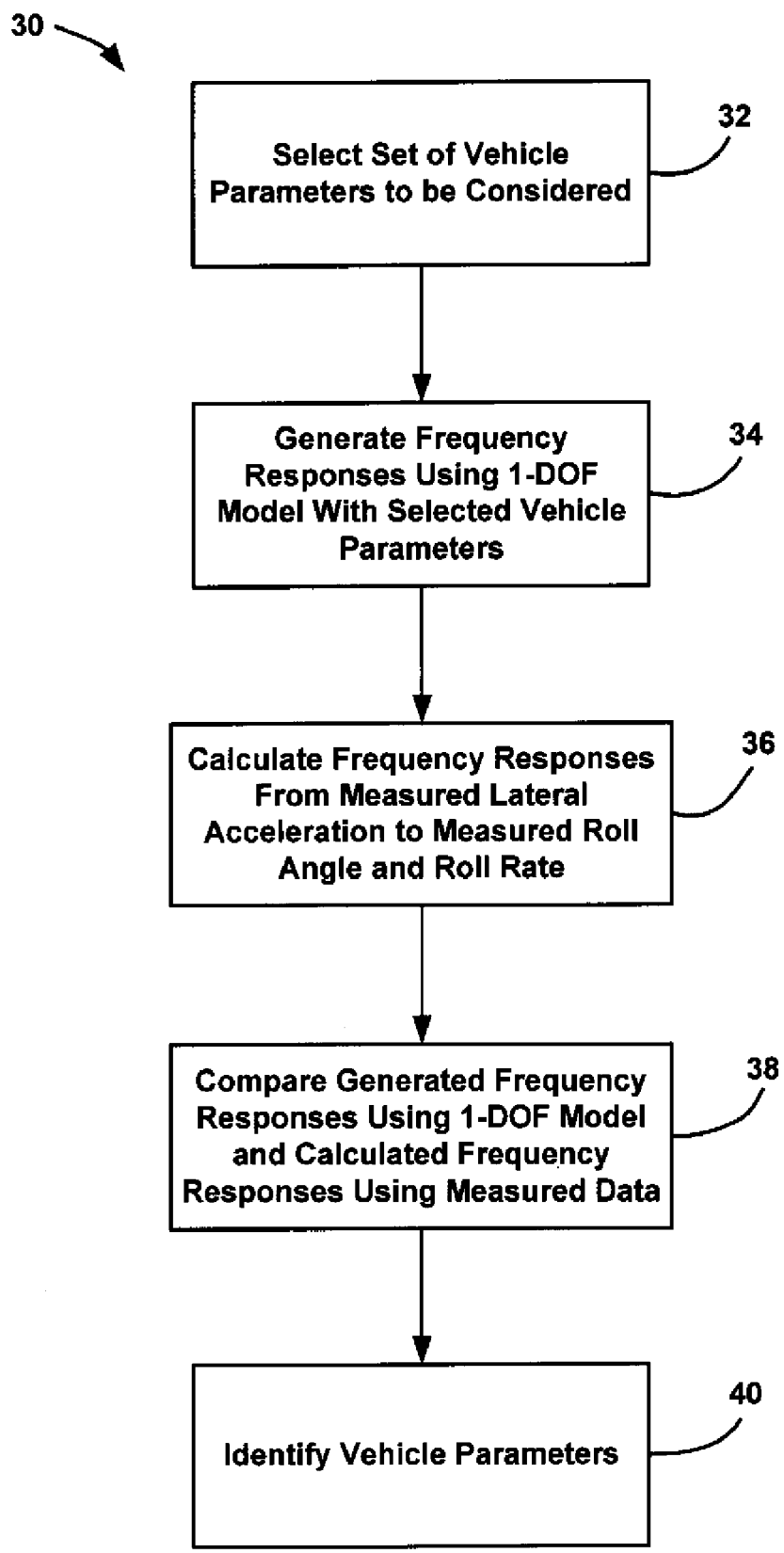
FIG. 3 is a flow-chart diagram showing a process for determining vehicle CG height and mass, according to an embodiment of the present invention.

FIG. 3 is a flow chart diagram 30 showing a process for determining the vehicle CG height h and mass $M_s$ in the processor 28, according to an embodiment of the present invention. At box 32, a set of vehicle parameters is selected to determine the vehicle CG height h and mass $M_s$. In the discussion above, the three vehicle parameters are the mass $M_s$ of the vehicle body 16, the roll moment of inertia $I_{xx}$ and the CG height h. The process then determines the frequency response using the 1-DOF model of equation (1) and the selected vehicle parameters at box 34. Particularly, the process calculates the frequency response for the three sets of vehicle parameters for the mass $M_s$, the moment of inertia $I_{xx}$ and the CG height h using equations (2) and (3), where the frequency response for the measured or estimated roll angle φ will be used for equation (2) and the frequency response for the measured or estimated roll rate φ̇ will be used for equation (3). Thus, six frequency response signals will be stored on the vehicle from these off-line calculations.

Now that the generated frequency responses are stored in the vehicle, the roll over mitigation system, or other vehicle control system, will calculate the frequency responses during vehicle operation at box 36. Particularly, the system on a vehicle that would benefit from knowing the CG height h and mass $M_s$ of the vehicle 10 for roll over mitigation or other uses will periodically determine those values during vehicle operation. The frequency response can be calculated each time the vehicle is started, each time a different vehicle loading is detected, or at any other suitable interval. If the vehicle employs a sensor or algorithm for measuring and/or estimating vehicle roll angle φ, then the frequency response for the measured lateral acceleration $a_y$ as an input and the roll angle φ as an output is used. If the vehicle employs a sensor or algorithm for measuring and/or estimating the roll rate φ̇ of the vehicle 10, then the frequency response for the measured lateral acceleration $a_y$ as an input and the roll rate $\dot{\phi}$ as an output is used. If the vehicle includes both sensors to measure vehicle roll angle $\phi$ and roll rate $\dot{\phi}$ and/or an algorithm to estimate vehicle roll angle $\phi$ and roll rate $\dot{\phi}$, then the process can use the frequency response for both.

The calculated frequency response from the measured lateral acceleration $a_y$ to the measured or estimated roll angle $\phi$ and/or roll rate $\dot{\phi}$ is then compared to the frequency responses for the parameters stored in the memory at box 38. The algorithm determines the best fit of the calculated frequency response to the stored frequency response, and uses those vehicle parameters for the closest comparison at box 40. Any suitable process can be used to determine which of the calculated frequency responses most closely matches the stored frequency responses, such as an RMS process.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining vehicle center of gravity height and vehicle mass, said method comprising:
    selecting a set of vehicle parameters to be considered that includes the vehicle mass and the center of gravity height;
    generating frequency responses using a predetermined model for a plurality of different values for the selected vehicle parameters, and storing the generated frequency responses for the selected parameters;
    calculating frequency responses for a measured vehicle lateral acceleration to a roll angle and/or a roll rate of the vehicle;
    comparing the generated frequency responses and the calculated frequency responses to determine which of the generated frequency responses more closely matches the calculated frequency responses; and
    selecting the generated frequency responses that most closely match the calculated frequency responses to determine the center of gravity height and the vehicle mass.

2. The method according to claim 1 wherein generating frequency responses includes using a one degree-of-freedom model.

3. The method according to claim 2 wherein the one degree-of-freedom model is provided by the equation:

$$(I_{xx}+M_s h^2)\ddot{\phi}+b^r\dot{\phi}+k_r\phi=M_s h a_y$$

where $I_{xx}$ is the roll moment of inertia of a vehicle body, $M_s$ is the vehicle mass, h is the vehicle center of gravity height, $\phi$ is the roll angle, $\dot{\phi}$ is the roll rate, $\ddot{\phi}$ is the roll acceleration, $a_y$ is the measured lateral acceleration, $b_r$ is roll damping coefficient and $k_r$ is roll stiffness.

4. The method according to claim 1 wherein calculating frequency responses includes using an estimated or measured roll angle and/or roll rate.

5. The method according to claim 1 where generating frequency responses for a roll angle includes using the equation:

$$F_{Ay,Ra}(s) = \frac{M_s h}{(I_{xx}+M_s h^2+b_r s)+k_r}$$

where F is the frequency response, $I_{xx}$ is the roll moment of inertia of a vehicle body, $M_s$ is the vehicle mass, h is the vehicle center of gravity height, $b_r$ is roll damping coefficient and $k_r$ is roll stiffness.

6. The method according to claim 1 wherein generating the frequency responses for a roll rate includes using the equation:

$$F_{Ay,RR}(s) = \frac{M_s h s}{(I_{xx}+M_s h^2)s^2+b_r s+k_r}$$

where F is the frequency response, $I_{xx}$ is the roll moment of inertia of a vehicle body, $M_s$ is the vehicle mass, h is the vehicle center of gravity height, $b_r$ is roll damping coefficient and $k_r$ is roll stiffness.

7. The method according to claim 1 wherein the selected vehicle parameters includes the vehicle mass, the vehicle CG height and the vehicle roll moment of inertia.

8. The method according to claim 1 wherein the plurality of different values for the set of selected vehicle parameters includes values for low loads, values for nominal loads and values for high loads.

9. The method according to claim 1 wherein generating and calculating frequency responses includes generating and calculating frequency responses in a frequency range of interest between 0.1 Hz and 2 Hz.

10. The method according to claim 1 wherein comparing the generated frequency responses and the calculated frequency responses includes using a root mean square process.

11. A method for determining vehicle center of gravity height and vehicle mass, said method comprising:
    selecting the vehicle center of gravity height, the vehicle mass and a moment of inertia as vehicle parameters to be considered;
    generating frequency responses using a one degree-of-freedom vehicle model for a plurality of different values for the selected vehicle parameters for both vehicle roll angle and roll rate, and storing the generated frequency responses for the selected parameters;
    calculating frequency responses from a measured vehicle lateral acceleration to a measured or estimate roll angle and/or roll rate of the vehicle during vehicle operation;
    comparing the generated frequency responses and the calculated frequency responses to determine which of the generated frequency responses more closely matches the calculated frequency responses; and
    selecting the generated frequency responses that most closely match the calculated frequency responses and using the values of the selected vehicle parameters to determine the center of gravity height and the vehicle mass.

12. The method according to claim 11 wherein the one degree-of-freedom model is provided by the equation:

$$(I_{xx}+M_s h^2)\ddot{\phi}+b_r\dot{\phi}+k_r\phi=M_s h a_y$$

where $I_{xx}$ is the roll moment of inertia of a vehicle body, $M_s$ is the vehicle mass, h is the vehicle center of gravity height, $\phi$ is the roll angle, $\dot{\phi}$ is the roll rate, $\ddot{\phi}$ is the roll acceleration, $a_y$ is the measured lateral acceleration, $b_r$ is roll damping coefficient and $k_r$ is roll stiffness.

13. The method according to claim 11 where generating frequency responses for a roll angle includes using the equation:

$$F_{Ay,Ra}(s) = \frac{M_s h}{(I_{xx}+M_s h^2+b_r s)+k_r}$$

where F is the frequency response, $I_{xx}$ is the roll moment of inertia of a vehicle body, $M_s$ is the vehicle mass, h is the vehicle center of gravity height, $b_r$ is roll damping coefficient and $k_r$ is roll stiffness.

14. The method according to claim 11 wherein generating the frequency responses for a roll rate includes using the equation:

$$F_{Ay,RR}(s) = \frac{M_s h s}{(I_{xx} + M_s h^2)s^2 + b_r s + k_r}$$

where F is the frequency response, $I_{xx}$ is the roll moment of inertia of a vehicle body, $M_s$ is the vehicle mass, h is the vehicle center of gravity height, $b_r$ is roll damping coefficient and $k_r$ is roll stiffness.

15. The method according to claim 11 wherein the plurality of different values for the set of selected vehicle parameters includes values for low loads, values for nominal loads and values for high loads.

16. The method according to claim 11 wherein generating and calculating frequency responses includes generating and calculating frequency responses in a frequency range of interest between 0.1 Hz and 2 Hz.

17. The method according to claim 11 wherein comparing the generated frequency responses and the calculated frequency responses includes using a root mean square process.

18. A method for determining vehicle center of gravity height and vehicle mass, said method comprising:

generating frequency responses using a predetermined model for a plurality of different values for the vehicle center of gravity height and the vehicle mass;

calculating frequency responses for a measured vehicle lateral acceleration to a roll angle and/or a roll rate of the vehicle; and comparing the generated frequency responses and the calculated frequency responses to determine which of the generated frequency responses more closely matches the calculated frequency responses to determine the center of gravity height and the vehicle mass.

19. The method according to claim 18 wherein generating frequency responses includes using a one degree-of-freedom model.

20. The method according to claim 18 wherein the plurality of different values for the set of selected vehicle parameters includes values for low loads, values for nominal loads and values for high loads.

* * * * *